United States Patent
Leaman

(10) Patent No.: US 8,940,371 B2
(45) Date of Patent: Jan. 27, 2015

(54) POLYMERIC COMPOSITION FOR CEMENT BASED SUBSTRUCTURES

(75) Inventor: Michael Ray Leaman, York, PA (US)

(73) Assignee: Uniseal Solutions Inc., York, PA (US)

( * ) Notice: Subject to any disclaimer, the term of this patent is extended or adjusted under 35 U.S.C. 154(b) by 0 days.

(21) Appl. No.: 14/113,852

(22) PCT Filed: May 2, 2012

(86) PCT No.: PCT/US2012/000231
§ 371 (c)(1),
(2), (4) Date: Oct. 25, 2013

(87) PCT Pub. No.: WO2012/150967
PCT Pub. Date: Nov. 8, 2012

(65) Prior Publication Data
US 2014/0044879 A1 Feb. 13, 2014

Related U.S. Application Data

(60) Provisional application No. 61/518,357, filed on May 4, 2011.

(51) Int. Cl.
| | | |
|---|---|---|
| *B05D 1/00* | (2006.01) | |
| *C08L 27/08* | (2006.01) | |
| *C04B 41/00* | (2006.01) | |
| *C04B 41/48* | (2006.01) | |
| *C04B 41/52* | (2006.01) | |
| *C04B 41/63* | (2006.01) | |
| *C04B 41/71* | (2006.01) | |
| *C08L 33/10* | (2006.01) | |
| *B32B 13/00* | (2006.01) | |
| *B32B 13/12* | (2006.01) | |
| *B32B 27/00* | (2006.01) | |
| *B32B 27/30* | (2006.01) | |
| *C08F 214/08* | (2006.01) | |
| *C08F 214/22* | (2006.01) | |
| *C08L 27/00* | (2006.01) | |
| *C08L 27/16* | (2006.01) | |
| *C08L 33/08* | (2006.01) | |

(52) U.S. Cl.
CPC .............. *C08L 27/08* (2013.01); *C04B 41/009* (2013.01); *C04B 41/4838* (2013.01); *C04B 41/52* (2013.01); *C04B 41/63* (2013.01); *C04B 41/71* (2013.01); *C08L 33/10* (2013.01); *B32B 13/00* (2013.01); *B32B 13/12* (2013.01); *B32B 27/00* (2013.01); *B32B 27/304* (2013.01); *B32B 27/308* (2013.01); *C08F 214/08* (2013.01); *C08F 214/22* (2013.01); *C08L 27/00* (2013.01); *C08L 27/16* (2013.01); *C08L 33/08* (2013.01)

USPC .......................... 427/393.6; 524/523; 525/228

(58) Field of Classification Search
None
See application file for complete search history.

(56) References Cited

U.S. PATENT DOCUMENTS

| | | |
|---|---|---|
| 3,309,330 A | 3/1967 | Settlage |
| 4,206,105 A | 6/1980 | Stafford |
| 4,233,362 A | 11/1980 | Novak et al. |
| 5,202,188 A * | 4/1993 | Bekele ........................... 428/414 |
| 5,328,952 A | 7/1994 | Brodnyan et al. |
| 5,759,702 A * | 6/1998 | Bekele ........................... 428/518 |
| 6,713,105 B1 * | 3/2004 | Bekele ........................... 426/127 |
| 2006/0173147 A1 | 8/2006 | Fukuda |
| 2009/0123678 A1 * | 5/2009 | Beyer et al. .................. 428/34.8 |

FOREIGN PATENT DOCUMENTS

| | | |
|---|---|---|
| DE | 2725586 A1 | 12/1978 |
| EP | 0227385 A2 | 7/1987 |
| EP | 0254418 A2 | 1/1988 |
| EP | 0185465 B1 | 2/1989 |
| JP | H06116531 A | 4/1994 |

OTHER PUBLICATIONS

Penzel et al, Die Angewandte Makromolekulare Chemie, 273, pp. 15-27, 1999.*
Li et al, Journal of Applied Polymer Science, 61, pp. 2397-2402, 1996.*
Collins et al, Polymer Degradation and Stability, 66, pp. 87-94, 1999.*
Abstract of Li et al, Chinese Journal of Polymer Science, 14(2), pp. 105-110, 1996.*
International Search Report for PCT/US2012/000231 dated Jul. 17, 2012.
European Search Report which issued on Sep. 3, 2014 in corresponding EP Application No. 12779712.4.
First Office Action which issued on Nov. 3, 2014 in corresponding CN Application No. 201280021470.5, with English translation thereof.

* cited by examiner

*Primary Examiner* — Erma Cameron
(74) *Attorney, Agent, or Firm* — Fish & Richardson P.C.

(57) ABSTRACT

The present invention is directed to a composition capable of inhibiting moisture vapor emission from concrete structures and enhancing adhesion of a finish material to the concrete structure comprising an aqueous mixture of a first copolymer of mer units formed from vinylidene halide and a C1-C2 alkyl acrylate with a second copolymer of mer units formed from vinylidene halide and a C4-CS alkyl acrylate and to the method of forming a moisture barrier/adhesion promoter coating on concrete comprising applying from 2.8 to 5.6 liters (0.75 to 1.5 gallons) of an aqueous carrier having from 10 to 50 weight percent of the mixture of copolymers stated above per 14 m2 (150 square feet) of the free surface of a concrete structure.

22 Claims, No Drawings

POLYMERIC COMPOSITION FOR CEMENT BASED SUBSTRUCTURES

This application is a national stage application, under U.S.C. 371, of PCT/US12/00231, filed May 2, 2012, which claims benefit of U.S. Provisional Application No. 61/518,357, filed May 4, 2011.

BACKGROUND OF THE INVENTION

The present invention relates to polymeric compositions formed from a mixture of prescribed copolymers in certain defined ratios and the use of said composition to provide enhanced cement based building structures. The subject composition provides a water vapor barrier coating for cement based structures and an enhanced adhesion agent for materials applied thereto. Further, the composition, when applied to green (uncured) cement based structures, causes resultant cured structures to have enhanced strength and integrity.

Cement compositions and materials, such as concrete, cement block and the like, are common materials used in the construction industry. The term "concrete" and "cement" are each used herein and in the appended claims to refer to materials and structures formed of cement based compositions. The present invention is described by use of concrete building structures, such as slabs and the like, used as building flooring and wall structures although it is intended that other forms of cement based compositions be included in the present invention.

When concrete is poured, there is a period of time required to attain initial solidification of the concrete mixture. After initial setting, the concrete cures over an extended period of time during which hydration of the silicate and aluminate components develop and the excess water of the initial mix is lost. It is only after this extended period that the concrete has developed its full strength. In order for the concrete to properly cure and achieve its designed strength, the rate of water loss must be kept low. Such concrete is termed "green" structures while they are in their initial formation and in the partially cured state. Thus, it is well known that concrete structures contain and expel water for extended periods of time after initial formation.

When a concrete structure is formed directly adjacent to the ground or when grading of the surrounding terrain is complete, the structure in contact with ground material is continuously feed water from the ground by hydrostatic pressure. This is especially true when the concrete forms a grade-level or below grade-level flooring of a building or a below grade-level wall. In the case of a wall structure, the outside of the wall that is adjacent to the terrain is normally coated with a composition or structural forming membrane which inhibits the penetration of water into the wall material. Similarly, flooring slabs are normally poured over a bed of gravel and a plastic membrane to inhibit penetration of water into the slab formation. In both instances, the membranes are known to be less than completely effective due, in part, to imperfections in the membrane, imperfections generated during formation and pouring of the concrete, during backfill of the terrain against the wall structure, and from deterioration of the membrane over time. Thus, concrete structures have a tendency to take up water and expel the water through its free surface over extended periods of time.

When the concrete structure remains as formed and has an uncovered free surface, the water that escapes from the structure may be of a sufficiently small rate and in a form (e.g. water vapor) to be unnoticeable and inconsequential. However, when the concrete structure is intended to act as a substructure to be covered by additional material to form a finished structure, the additional material tends to trap the moisture. It has been previously suggested to coat concrete surfaces with various paints, including those based on an acrylate polymer in attempts to form water barrier coating. Such coatings generally exhibit poor adhesion and tend to spall from the concrete structure. These adverse effects cause deterioration of the applied finishing material as well as the bonding agent used to adhere finishing materials to the concrete substructure. Further, the trapped moisture may cause mold and other undesired formations to occur.

It is highly desired to be able to apply a sealer/coating composition capable of inhibiting moisture vapor emission from concrete structures, to have high adhesion to concrete structures and to enhance the adhesion of a concrete substructure to finishing materials commonly used in building industry. It is also highly desired to have a composition having the above properties that can be applied to green concrete substructures as well as fully cured concrete substructures to, thereby, enhance job scheduling and completion. It is further desirable to inhibit evaporation of water during initial curing of freshly formed concrete structures to allow hydration to occur slowly during curing and thereby produce a resultant structure having high strength and integrity.

SUMMARY OF THE INVENTION

The present invention is directed to a composition capable of inhibiting moisture vapor emission from concrete structures and enhancing adhesion of a finish material to the concrete structure comprising an aqueous mixture of a first copolymer of vinylidene halide and a $C_1$-$C_2$ alkyl acrylate with a second copolymer of vinylidene halide and a $C_4$-$C_5$ alkyl acrylate and to the method of forming a moisture barrier/adhesion promoter coating on concrete comprising applying from 2.8 to 5.6 liters (0.75 to 1.5 gallons) of an aqueous carrier having from 10 to 50 weight percent of the mixture of copolymers stated above per 14 $m^2$ (150 square feet) of the free surface of a concrete structure. The concrete structure unexpectedly exhibits enhanced low water vapor emission, enhanced adhesion of finished material applied thereto and inhibit spalling of the applied coating composition from the concrete surface. Further, it has been unexpectedly found that the composition of the present invention can be applied to surfaces of uncured or partially cured concrete structures to cause reduced evaporation of the water there from and, thus, results in formation of a structure of superior structural strength and integrity.

DETAILED DESCRIPTION OF THE INVENTION

It has been unexpectedly found that a mixture of two distinct copolymers, when combined together and applied to concrete formations in prescribed amounts, forms a coating capable of adhering to the concrete formation surface, providing a moisture vapor emission barrier and acting as an interfacial adhesion enhancer between the concrete surface and adhesive bonding agents of finish coverings.

It has also been unexpectedly found that the mixture of copolymers, when applied as an aqueous composition to the surface of uncured or partially cured concrete structures, provides a means of causing the resultant cured structure to have enhanced strength and integrity. To reduce water evaporation during the curing process, one conventionally applies blankets and/or repeated application of water to the surface of the structure while curing. Besides such applications being labor intensive and costly, the application of blankets to uncured surfaces may mar the formed structural surface and repeated application of water may reduce the strength of the resultant structure at and adjacent to its surface. These undesired properties are thus eliminated by a single application of an aqueous dispersion of the present mixture of first and second copolymers described herein below.

It has also been unexpectedly found that the present mixture provides a coating that exhibits high adhesion as well as wear and abrasion strength (tested under ASTM D4060-10) to concrete surfaces, even those that have been steel troweled to provide an ultra-smooth surface. This phenomenon is may be due to the ability of the mixture to become incorporated into portion of the concrete adjacent to the treated surface. Aqueous dispersions of prior art polymers, when applied to concrete surfaces, cause the surface layer of the structure to have reduced strength and adhesion properties and, therefore, it is prescribed that such surface layer be mechanically removed before conventional application of a finish floor covering. Finally, it has been found that the present mixture causes the surface of the concrete structure to have a substantially neutral pH of lower than about 8. This provides a surface that is substantially inert to finishing materials applied thereto.

The mixture is formed of a first copolymer formed from vinylidene halide and a $C_1$-$C_2$ alkyl acrylate, preferably from vinylidene chloride and methyl acrylate monomers. The formed copolymer has resultant $C_1$-$C_2$ alkyl acrylate mer units in from 5 to 40, preferably from 5 to 20 and most preferably from 5 to 15 percent by weight of the copolymer. The remainder of the first copolymer is composed of vinylidene halide mer units. The copolymer may also contain minor amounts (less than or equal to the weight percentage of the acrylate mer units) of mer units derived from other ethylenically unsaturated monomers capable of copolymerizing with the required monomers taught above such as, for example, olefins as ethylene, propylene and the like; acrylonitrile and the like. The first copolymer is conventionally formed by free radical polymerization and is commercially available.

The mixture must further have a second copolymer which is formed from a vinylidene halide and a $C_4$-$C_5$ alkyl acrylate, preferably from vinylidene chloride and butyl acrylate, monomers. The formed copolymer has resultant $C_4$-$C_5$ alkyl acrylate mer units in from 3 to 40, preferably from 3 to 15, and most preferably from 3 to 10 percent by weight of the copolymer. The remainder of the second copolymer is composed of vinylidene halide mer units. The copolymer may also contain minor amounts (less than or equal to the weight percentage of the acrylate mer units) of mer units derived from other ethylenically unsaturated monomers capable of copolymerizing with the required monomers taught above such as, for example, olefins as ethylene, propylene and the like; acrylonitrile and the like. The polymer is conventionally formed by free radical polymerization and is commercially available.

The first and second copolymers forming the desired mixture should be present in a weight ratio of from 90:10 to 10:90, preferably from about 80:20 to 10:90 and more preferably from 75:25 to 20:80. In all instances, both the first and second copolymers described above must be present to provide the enhanced properties which are the achieved goals of the present invention. When the mixture is formed of first and second copolymer in weight ratios of from 90:10 to 60:40 (with from 80:20 to 70:30 being preferred and about 75:25 forming the most preferred mixture within this range), i.e. having high content of $C_1$-$C_2$ alkyl acrylate/vinylidene halide copolymer, the mixture is preferably applied as a dispersion having low concentration of from about 10 to 30 weight percent of the mixture of copolymers. It is preferable to have such dispersions applied as low dosage, multiple applications separated by drying periods of from 0.5 to 1.5 hours between applications. When the mixture is formed of first and second copolymer in weight ratios having lower concentration of $C_1$-$C_2$ alkyl acrylate/vinylidene halide copolymer, i.e. 50:50 to 10:90 (preferably from 40:60 to 25:75 and most preferably from 30:70 to 35:65), it is preferable to apply the subject mixture as a high solid concentration dispersion having from 25 to 50 weight percent of the mixture of copolymers. In this embodiment, a single, high dosage application of the dispersion is normally sufficient, although multiple applications may be used. The ability to be applied in a single application is highly desired as the labor and the time for application, taking account of the interim drying times when multiple applications are used, are minimized. The high concentration dispersion can be applied as a relatively thick coating and provides, when dried, a pliable, abrasion resistant coating exhibiting extremely high adhesion and moisture barrier properties with respect to the concrete substrate.

The mixture of the first and second copolymers within the above ratio range have been unexpectedly found to achieve the desired combination of properties of providing high reduction in moisture vapor emission from the free (treated) surface of the concrete formation, that is, the exposed surface, forming a layer of concrete structure adjacent to the exposed surface which is impregnated with the polymer mixture, forming a film on the free surface of the concrete structure which has a high bond strength with the concrete surface, does not exhibit deterioration in the form of cracking and the like so that it maintains its moisture barrier properties over time; and at the same time provides good interfacial bonding properties between the concrete surface and the adhesive coat used for bonding conventional surface finish material thereto. The subject composition is capable of readily forming a moisture barrier coating on concrete surfaces which provide a means of enhancing the use life of finished materials applied thereto, including those that are applied by adhesives (e.g. thin set cement, polyurethanes, epoxy systems and the like), or directly thereon (e.g. floating floor coatings and the like).

The two copolymers, either separately or as a prior combined mixture, are mixed with water to provide an aqueous dispersion having from 10 to 50 weight percent of the combined copolymer. As stated above, the dispersion has preferably from 10 to 30, with from 15 to 30 and from 20 to 30 weight percent of the combined copolymer when the mixture is composed of a high content of the $C_1$-$C_2$ alkyl acrylate/vinylidene halide copolymer while the applied dispersion preferably has a high solid content of from 25 to 50, preferably from 30 to 40 weight percent solids of mixtures having lower content of the $C_1$-$C_2$ alkyl acrylate/vinylidene halide copolymer.

Normally, the resultant dispersion of the polymers in water is achieved by high shear mixing with the resultant mixture consisting of small particles of the copolymers in particle size of from about 50 to about 250 nm. Conventional emulsifiers and dispersants may be used to aid in forming a uniform composition. The resultant dispersions should be acidic with a pH of from about 1.5 to 3.5, preferably a pH of from about 2 to 3 with from 2.2 to 2.7 being most preferred. The pH can be adjusted to the desired range by additions of small amounts of mineral acid, as needed. The aqueous dispersion may contain small amounts (normally less than about 5 weight percent) of UV stabilizers, dispersants, emulsifiers, stabilizers and/or colorants (optionally added to aid in assuring complete application coverage).

Aqueous dispersions of each of the first and of the second copolymer may be shipped in concentrated form, mixed together, and further diluted with water at blending facilities using conventional mixers, such as high shear mixers. Further, aqueous dispersions of the mixture of first and second copolymer may be shipped in concentrated form to the job site and mixed with fresh water to reduce the concentration to the appropriate range for the mode of application and the resultant coating described herein above. The dispersion, applied as a single or as multiple coats, should be sufficient to form a moisture barrier/adhesion promoter coating on the targeted concrete substructure.

The aqueous dispersion having the subject copolymer mixture can be readily applied to the concrete surface by spray, brush, high nap paint roller, with the aid of a squeegee or the like to provide a thin, substantially uniform coating of the dispersion onto the concrete surface. The dispersion, as solids, should be applied to provide from about 0.9 to 9 pounds (0.4 to 4 kg) of the solids of the mixture of copolymers per 14 m$^2$ (150 square feet) to the free surface of a concrete structure upon evaporation of the water media. When the copolymer mixture has a high content of $C_1$-$C_2$ alkyl acrylate/vinylidene halide copolymer, the mixture is preferably applied as a low concentration dispersions having from about 10 to 30 weight percent of the mixture of copolymers. The dispersion should preferably be applied in multiple coats to result in a coating having from 1.9 to about 5 pounds (0.8 to 2.3 kg), preferably from 2.5 to 3 pounds (1.1 to 1.4 kg) of solid mixture per 14 m$^2$ (150 ft$^2$) of free surface of the concrete structure. In such applications it is preferred to apply the mixed copolymer dispersion in at least two applications when over 2 pounds (0.9 kg) of solids are applied to form the coating, with a 0.5 to 1.5 hour drying time between coats. The coats are best applied by a first coat application in one direction with a second coat application in a direction that is transverse to the first coat application direction. When the copolymer mixture has a low content of $C_1$-$C_2$ alkyl acrylate/vinylidene halide copolymer, the mixture is preferably applied as a high concentration dispersions having from about 25 to 50 weight percent of the mixture of copolymers. Such dispersions may preferably be applied in a single application to result in a coating having from 4 to about 9 pounds (1.8 to 4 kg), preferably from 5.5 to 9 pounds (2.5 to 4 kg) of solid mixture per 14 m$^2$ (150 ft$^2$) of free surface of the concrete structure. The resultant coating is thus applied in one application which is both time and labor saving yet provides a tough, flexible finished coating.

Dispersions of the copolymer mixture can be applied to green as well as substantially fully cured concrete formations to achieve the desired properties. Usually the dispersion can be applied at any time after 12 hours (and as short a time as 3 hours) from the formation of the structure. Further, the dispersion, even when used with low amounts of solid content, dries within six, most times within four, hours of application. The drying time for the applied dispersion has been found not to be dependent on the ambient conditions of the environment of the slab being treated. The dispersion has been found to dry to the desired barrier coating and barrier concrete surface layer independent of the degree of cure of the concrete substrate to which it is applied. Thus, this allows for installation of finish material within short periods and does not hinder the progress of building schedules. The formula has been applied to green concrete with an epoxy applied four hours later. It has been unexpectedly found to completely eliminate out gassing that almost always is known to cause blistering and pin holing of epoxy when used on new concrete.

The application of the present mixture to uncured or partially cured concrete structures provides a means for allowing the concrete to cure in a desired slow manner to produce a structure of enhanced strength and integrity without the use of application of a covering, such as a tarp, or repeat water spray applications to the structure which are the conventional, though labor intensive, manners used to reduce water evaporation. The single application of aqueous dispersions of the above described mixtures of copolymers, especially those formed with first and second copolymers in weight ratios of 50:50 to 10:90, and more preferably from 35:65 to 10:90, as a means of inhibiting water evaporation during the initial curing of green concrete structures, achieves the desired results without the undesired laborious application of tarps or water to the structure's free surface. Further, application of the present mixture of copolymers substantially eliminates any potential of marring the surface by covering it with tarps and the like or by reducing the strength of the surface layer of the concrete by water spray application. Instead, it has been found that the mixtures of copolymers described herein becomes adsorbed (or absorbed) in and becomes an integral part of the layer of the green concrete structure adjacent to the treated surface. It has been found by observation and microscopic examination that the application of the above described mixture of copolymers does not remain on the surface but, instead, readily penetrates (For normal application, the mixture penetrates to depths ranging from about 15 to 25 mils, such as an average of about 18 mils, below the surface) into the structure adjacent to the treated surface causing the resultant structure to achieve a structure free of blemishes and having enhanced integrity and strength.

It has been found that when the presently prescribed mixtures of copolymers are applied as substantially uniform coating to concrete surfaces in the amounts stated above, one attains a film which inhibits water vapor emission (MVER) or Moisture Vapor Emission Rate according to ASTM 1869 to less than 3 pounds and most often to less than 2.5 pounds per 1000 ft$^2$ per 24 hours (Generally referred to in pounds). ASTM F710 specifically notes that concrete is suitably dry when the moisture vapor emission rate does not exceed three (3) lbs. of water per 1000 square feet per 24 hours when tested in accordance with the test method of ASTM F1869. The three pound point is used as a recognized benchmark by manufacturers of floor covering, adhesive and resinous coating products as it is known not to cause adverse effects due to moisture. At the same time, the formed coating of the present invention exhibits high adhesion to the concrete surface, can be readily applied to green as well as fully cured concrete structures and provides good compatibility and adhesion with a wide range of adhesives used in the industry when applying finished surfaces.

The materials that are desirable to act as finishing coverings include flooring products, such as, for example, solid wood planking, wood laminates, polymeric laminates (linoleum and the like products), vinyl/VCT, rubber, epoxy flooring systems, various tile flooring, carpeting and self-leveling cement underlayment and wear surfaces. These materials are conventionally applied to a concrete slab by applying an adhesive composition suitable for the particular flooring product. Applications are conventionally done with notched trowel to apply a prescribed and even amount of adhesive for the adhesion of the finish covering. The present mixture has been unexpectedly found to be compatible and have high adhesion properties with respect to a wide variety of adhesives, such as acrylic latex, transitional pressure sensitive adhesives, polyurethanes and the like conventionally used for bonding the finished covering material to the concrete subfloor structure.

The following examples are given for illustrative purposes only and are not meant to be a limitation on the invention described herein or on the claims appended hereto. All parts and percentages given in the description, examples and appended claims are by weight unless otherwise stipulated. Further all ranges or numbers provided herein shall be deemed to specifically disclose all subset ranges within each given range.

EXAMPLE I

A series of 12" round concrete slabs were cast using commercially obtained bags of dry concrete mix (Ready-Mix) which were mixed with clean water using instructions applicable to the 4,000 psi bag mixture. The uniform concrete mixture was then poured into molds formed of 3.5" high steel frame over a rubber base. This was performed by applying three lifts, each being vibrated and compacted then smooth trowel finished. Within 48 hours, the frame was removed and sample slab cured for 28 days. A 100% solids epoxy (3 coats) was then applied to the 3.5" side and 2" perimeter of the top and bottom leaving a 9.75" diameter exposed concrete area on the center of the top and bottom of the sample slab. This was allowed to cure for 7 days. The samples were then coated with a sufficient amount of an aqueous mixture having 22 wt. percent solids of a mixture of first copolymer having 10 wt. % methyl acrylate and 90 wt. % vinylidene chloride and a second copolymer having 5 wt % butyl acrylate, 5 wt % acrylonitrile and 90 wt. % vinylidene chloride to provide a solid coating at the rate of 2.8 pounds per 14 $m^2$ per coat with two coats 1 hour apart. The aqueous composition had a pH of 2. After 4 hours, the samples were placed into the test apparatus to start water vapor increase to desired amounts.

Aqueous dispersions having 22 wt. % solids of a 90:10 mixture of vinylidene chloride/methyl acrylate copolymer with vinylidene chloride/butyl acrylate copolymer was applied over the surface of three slab samples 12 hours after initial casting to represent application over "green" concrete slab. An additional three slabs were coated 30 days after casting to represent fully cured concrete. The dispersion easily spread using a one-quarter inch nap paint roller with two coats applied at the rate of 14 $m^2$ per gallon total for the two coats. In all cases the coatings were found to be dry to the touch in less than 0.5 hours after application.

The moisture blocking ability (of the subject mixed copolymer coating was determined by measuring the moisture vapor emission rate (MVER) for each sample according to the procedures of ASTM F 1869 before application of the coating and 28 days after application of the coating. The results given in Table 1 are the average for each set of three samples. The apparatus used provided simulation of high moisture vapor pressure on the samples. The treated samples showed high barrier ability and good retained adhesion between concrete and barrier coating.

In addition, a 50 mm diameter dolly had epoxy applied and was placed on the copolymer coated concrete samples. Adhesion pull test were conducted according to ASTM D7234. The results are given in Table 1 herein below.

The above test procedure was repeated using coatings formed from dispersions of varying ratios of the two copolymers. The coatings formed with mixtures containing both copolymers preformed well for both MVER and adhesion. The coatings applied easily and yielded a surface showing no deterioration over time. The results are given in Table 1 below.

EXAMPLE II

For comparative purposes, the tests described in Example I above, were conducted using each of the copolymers separately. The results of these tests are reported in Table II below. The results show that neither copolymer, when used alone, formed a coating having the desired properties achieved with the present described mixture of copolymers. Coatings of VC/methyl acrylate exhibited substantially no adhesive properties with respect to the concrete to which it was applied. Further, the resultant VC/methyl acrylate coatings were brittle and shattered under light impact forces. Thus, coatings of VC/methyl acrylate would not produce a suitable coating to impart moisture blocking and adhesion properties presently achieved by the present invention. Further, the results show that VC/butyl acrylate copolymer, when used alone, formed a coating having poor moisture blocking properties (test values above 3.0 are unacceptable); the cured coating exhibited micro-cracks throughout and the coating permeated less than 4 mils into the cement substructure surface.

TABLE 1

| VC/Methyl Acrylate | 90 | 85 | 80 | 75 | 70 | 60 | 30 |
|---|---|---|---|---|---|---|---|
| VC/Butyl Acrylate (wt. %) | 10 | 15 | 20 | 25 | 30 | 40 | 70 |
| Moisture Blocking (lbs) | 30.02 to 2.51 | 24.25 to 2.92 | 16.49 to 1.67 | 20.74 to 2.00 | 19.73 to 1.84 | 19.9 to 2.53 | 19.7 to 2.15 |
| Adhesion Pull Test (lbs) | 32.75 | 106.3 | 317.5 | 387.6 | 192.7 | 84.3 | 324 |
| Dry Time to Touch (hr) (at 70° F. RH at 50%) | 0.1 | 3.4 | 5.3 | 9.2 | 2.5 | 14.0 | |
| Observations | Spread and cover evenly and easily; no deterioration of covering over time | Spread and cover evenly and easily; no deterioration of covering over time | Spread and cover evenly and easily; no deterioration of covering over time | Spread and cover evenly and easily; no deterioration of covering over time | Spread and cover evenly and easily; no deterioration of covering over time | Spread and cover evenly and easily; no deterioration of covering over time | Spreads and covers evenly and easily; adsorbs into slab; produces flexible coating after cure; no deterioration over time |

TABLE II

| | | |
|---|---|---|
| VC/Methyl Acrylate | 100 | 0 |
| VC/Butyl Acrylate (wt. %) | 0 | 100 |
| Moisture Blocking (lbs) | 20.25 to 2.65 | 18.22 to 3.25 failed |
| Adhesion Pull Test (lbs) | 0 failed | 300.5 |
| Observations | Formed brittle coating; shattered under low weight impact | Formed coating having micro-cracks throughout; high PERMS |

EXAMPLE III

An aqueous dispersion having 40 wt. % solids of a 30:70 mixture of vinylidene chloride/methyl acrylate copolymer with vinylidene chloride/butyl acrylate copolymer was tested for abrasion resistance according to the test method defined under ASTM D4060-10 ("Standard Test Method for Abrasion Resistance of Organic Coating by Taber Abraser") and for acid/alkali resistance according to the test method of ASTM C1315-11. Four test panels of 13×9×0.5 inch (330×229×13 mm) formed of white cement mortar were fabricated in accordance with ASTM D1734-07 entitled "Standard Practice for Making Cementitious Panels for Testing Coatings". The panels were steel trowel finished and two of the panels were coated by spraying the aqueous dispersion of 30:70 mixture thereon to give a 12.7 ml coating per 0.85 ft² 0.26 m². The coatings were applied to the panels under moist conditions approximately three hours after placing the fresh mortar. All four panels were left to cure at 73+/−2° F. (23+/−3° C.) and RH of 50+/−2%. After two days of curing, 4×4 inch (17×17 mm) coupons were cut from the panels for Taber and acid/alkali tests.

The results of triplicate samples are given in Tables III and IV below.

TABLE III

| | | | | | | | | | |
|---|---|---|---|---|---|---|---|---|---|
| Taber Abrasion Test Coated Samples | | | | | | | | | |
| sample | Wt. Initial g. | Wt. 25 cycle | Wt. 50 cycle | Wt. 75 cycle | Wt. 100 cycle | Wear index 25 cycle | Wear index 50 cycle | Wear index 75 cycle | Wear index 100 cycle |
| 1 | 326.8 | 325.3 | 323.2 | 321.5 | 320.2 | 60.0 | 72.0 | 70.7 | 66.0 |
| 2 | 325.2 | 323.9 | 322.2 | 320.2 | 319.2 | 52.0 | 60.0 | 62.7 | 60.0 |
| 3 | 327.7 | 326.7 | 325.5 | 324.3 | 323.2 | 40.0 | 44.0 | 45.3 | 45.0 |
| Avg. | | | | | | 50.67 | 58.67 | 59.56 | 57.00 |

| | | | | | | | | | |
|---|---|---|---|---|---|---|---|---|---|
| Taber Abrasion Test Uncoated Control Samples | | | | | | | | | |
| sample | Wt. Initial g. | Wt. 25 cycle | Wt. 50 cycle | Wt. 75 cycle | Wt. 100 cycle | Wear index 25 Cycle | Wear index 50 cycle | Wear index 75 cycle | Wear index 100 cycle |
| 1 | 315.8 | 312.8 | 310.6 | 309.9 | 307.6 | 120.0 | 104.0 | 78.07 | 82.0 |
| 2 | 313.8 | 310.7 | 308.9 | 307.7 | 306.7 | 124.0 | 98.0 | 81.3 | 71.0 |
| 3 | 320.1 | 317.0 | 314.8 | 313.1 | 311.8 | 124.0 | 106.0 | 93.3 | 83.0 |
| Avg. | | | | | | 122.67 | 102.67 | 84.22 | 78.67 |

TABLE IV

| | Alkali/Acid Test | |
|---|---|---|
| Test | Control (Uncoated) | Coated |
| Acid | No discoloration | No blistering, no pinholes No discoloration |
| Alkali | No discoloration | No blistering, no pinholes No discoloration |

I claim:

1. A composition composed of an aqueous mixture of at least one first copolymer comprising mer units derived from vinylidene halide and mer units derived from $C_1$-$C_2$ alkyl acrylate, said mer units derived from $C_1$-$C_2$ alkyl acrylate being present in from 5 to 40 weight percent of the first copolymer; and at least one second copolymer comprising mer units derived from vinylidene halide and mer units derived from $C_4$-$C_5$ alkyl acrylate, said mer units derived from $C_4$-$C_5$ alkyl acrylate being present in from 3 to 40 weight percent of the second copolymer, wherein said first copolymer and said second copolymer are in a weight ratio of 90:10 to 10:90; the first and second copolymers together form from 10 to 50 weight percent of the aqueous mixture; and the aqueous mixture has a pH of 1.5 to 3.5.

2. The composition of claim 1 wherein the first copolymer comprises from 5 to 15 weight percent of mer units derived from a $C_1$-$C_2$ alkyl acrylate and the second copolymer comprises from 3 to 10 weight percent of mer units derived from $C_4$-$C_5$ alkyl acrylate.

3. The composition of claim 2 wherein the first copolymer comprises a first copolymer comprising mer units of methyl acrylate and vinylidene chloride; and the second copolymer comprises mer units of butyl acrylate and vinylidene chloride.

4. The composition of claim 2 wherein the first and second copolymers are in a weight ratio of 90:10 to 60:40 and the first and second copolymers together comprise from 10 to 30 weight percent of the aqueous mixture.

5. The composition of claim 2 wherein the first and second copolymers are in a weight ratio of 50:50 to 10:90 and the first and second copolymers together comprise from 25 to 50 weight percent of the aqueous mixture.

6. The composition of claim 1 wherein the first copolymer comprises a first copolymer comprising mer units of methyl acrylate and vinylidene chloride; and the second copolymer comprises mer units of butyl acrylate and vinylidene chloride.

7. The composition of claim 1 wherein the first and second copolymers are in a weight ratio of 90:10 to 60:40 and the first and second copolymers together comprise from 10 to 30 weight percent of the aqueous mixture.

8. The composition of claim 1 wherein the first and second copolymers are in a weight ratio of 50:50 to 10:90 and the first and second copolymers together comprise from 25 to 50 weight percent of the aqueous mixture.

9. The composition of claim 8 wherein the first and second copolymers are in a weight ratio of from 30:70 to 35:65.

10. A method of inhibiting moisture vapor emission from the surface of a concrete structure and enhancing interfacial adhesion between the concrete surface and a covering thereon comprising applying to the concrete surface an aqueous mixture of at least one first copolymer comprising mer units derived from vinylidene halide and mer units derived from $C_1$-$C_2$ alkyl acrylate, said mer units derived from $C_1$-$C_2$ alkyl acrylate being present in from 5 to 40 weight percent of the first copolymer; and at least one second copolymer comprising mer units derived from vinylidene halide and mer units derived from $C_4$-$C_5$ alkyl acrylate, said mer units derived from $C_4$-$C_5$ alkyl acrylate being present in from 3 to 40 weight percent of the second copolymer, wherein said first copolymer and said second copolymer are in a weight ratio of 90:10 to 10:90; the first and second copolymers together form from 10 to 50 weight percent of the aqueous mixture; and the aqueous mixture has a pH of 1.5 to 3.5; said aqueous mixture substantially uniformly applied to the surface to distribute a coating having from 0.4 to 4 kg of copolymer mixture per 14 $m^2$ of free surface of the concrete structure.

11. The method of claim 10 wherein the first copolymer comprises from 5 to 15 weight percent of mer units derived from a $C_1$-$C_2$ alkyl acrylate and the second copolymer comprises from 3 to 10 weight percent of mer units derived from $C_4$-$C_5$ alkyl acrylate.

12. The method of claim 11 wherein the first copolymer comprises a copolymer of methyl acrylate and vinylidene chloride; and the second copolymer comprises a copolymer of butyl acrylate and vinylidene chloride.

13. The method of claim 11 wherein the first and second copolymers are in a weight ratio of 90:10 to 60:40 and the first and second copolymers together comprise from 10 to 30 weight percent of the aqueous mixture; said aqueous mixture is substantially uniformly applied to the surface to distribute from 0.4 to 2.3 kg of copolymer mixture per 14 $m^2$ of free surface of the concrete structure.

14. The method of claim 11 wherein the first and second copolymers are in a weight ratio of 50:50 to 10:90 and the first and second copolymers together comprise from 25 to 50 weight percent of the aqueous mixture; said aqueous mixture is substantially uniformly applied to the surface to distribute from 1.8 to 4 kg of copolymer mixture per 14 $m^2$ of free surface of the concrete structure.

15. The method of claim 10 wherein the first copolymer comprises a copolymer of methyl acrylate and vinylidene chloride; and the second copolymer comprises a copolymer of butyl acrylate and vinylidene chloride.

16. The method of claim 10 wherein the first and second copolymers are in a weight ratio of 90:10 to 60:40 and the first and second copolymers together comprise from 10 to 30 weight percent of the aqueous mixture; said aqueous mixture is substantially uniformly applied to the surface to distribute from 0.4 to 2.3 kg of copolymer mixture per 14 $m^2$ of free surface of the concrete structure.

17. The method of claim 16 wherein the aqueous mixture is applied by multiple applications.

18. The method of claim 10 wherein the first and second copolymers are in a weight ratio of 50:50 to 10:90 and the first and second copolymers together comprise from 25 to 50 weight percent of the aqueous mixture; said aqueous mixture is substantially uniformly applied to the surface to distribute from 1.8 to 4 kg of copolymer mixture per 14 $m^2$ of free surface of the concrete structure.

19. The method of claim 18 wherein the first and second copolymers are in a weight ratio of from 30:70 to 35:65 and the aqueous mixture is applied in a single application.

20. A method of inhibiting loss of water from an uncured or partially cured concrete structure comprising applying to the concrete surface an aqueous mixture of at least one first copolymer comprising mer units derived from vinylidene halide and mer units derived from $C_1$-$C_2$ alkyl acrylate, said mer units derived from $C_1$-$C_2$ alkyl acrylate being present in from 5 to 40 weight percent of the first copolymer; and at least one second copolymer comprising mer units derived from vinylidene halide and mer units derived from $C_4$-$C_5$ alkyl acrylate, said mer units derived from $C_4$-$C_5$ alkyl acrylate being present in from 3 to 40 weight percent of the second copolymer, wherein said first copolymer and said second copolymer are in a weight ratio of 90:10 to 10:90; the first and second copolymers together form from 10 to 50 weight percent of the aqueous mixture; and the aqueous mixture has a pH of 1.5 to 3.5; said aqueous mixture substantially uniformly applied to the surface to distribute a coating having from 0.4 to 4 kg of copolymer mixture per 14 $m^2$ of free surface of the concrete structure.

21. The method of claim 20 wherein the first copolymer and second copolymer are in a weight ratio of 50:50 to 10:90.

22. The method of claim 20 wherein the first copolymer and second copolymer are in a weight ratio of 35:65 to 10:90 and the first copolymer comprises mer units derived from methyl acrylate and vinylidene chloride; and the second copolymer comprises mer units derived from butyl acrylate and vinylidene chloride.

* * * * *